US010942387B2

(12) United States Patent
Fuchida et al.

(10) Patent No.: US 10,942,387 B2
(45) Date of Patent: Mar. 9, 2021

(54) OPTICAL LAMINATE

(71) Applicant: NITTO DENKO CORPORATION, Ibaraki (JP)

(72) Inventors: Takehito Fuchida, Ibaraki (JP); Katsunori Takada, Ibaraki (JP); Yoshitsugu Kitamura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/127,626

(22) Filed: Sep. 11, 2018

(65) Prior Publication Data
US 2019/0079343 A1 Mar. 14, 2019

(30) Foreign Application Priority Data
Sep. 14, 2017 (JP) .............................. JP2017-176797

(51) Int. Cl.
| | | |
|---|---|---|
| *G02F 1/1335* | (2006.01) | |
| *G02B 5/02* | (2006.01) | |
| *G02B 5/30* | (2006.01) | |
| *G02F 1/13363* | (2006.01) | |
| *B29D 11/00* | (2006.01) | |

(52) U.S. Cl.
CPC ..... *G02F 1/133504* (2013.01); *G02B 5/0242* (2013.01); *G02B 5/3041* (2013.01); *G02F 1/133502* (2013.01); *G02F 1/133528* (2013.01); *G02F 1/133553* (2013.01); *B29D 11/0073* (2013.01); *G02F 1/13363* (2013.01); *G02F 2203/02* (2013.01)

(58) Field of Classification Search
CPC ................................................. G02B 5/3041
See application file for complete search history.

(56) References Cited

U.S. PATENT DOCUMENTS

| | | | |
|---|---|---|---|
| 7,292,296 | B2 | 11/2007 | Kanbe et al. |
| 7,561,231 | B2 | 7/2009 | Kanbe et al. |
| 7,651,643 | B2 | 1/2010 | Saiki et al. |
| 8,625,063 | B2 | 1/2014 | Tamaki et al. |
| 8,698,981 | B2 | 4/2014 | Kameyama et al. |
| 9,304,239 | B2 | 4/2016 | Nam et al. |

(Continued)

FOREIGN PATENT DOCUMENTS

| | | |
|---|---|---|
| CN | 1826542 A | 8/2006 |
| CN | 102736320 A | 10/2012 |

(Continued)

OTHER PUBLICATIONS

Office Action dated Dec. 30, 2019, issued in counterpart KR application No. 10-2018-0109848, with English translation. (11 pages).

(Continued)

*Primary Examiner* — Sang V Nguyen
(74) *Attorney, Agent, or Firm* — Westerman, Hattori, Daniels & Adrian, LLP

(57) ABSTRACT

An object of the present invention is to provide an optical laminate that can achieve an excellent reflection hue and an excellent viewing angle characteristic. An optical laminate of the present invention includes a polarizer; a retardation layer configured to substantially function as a λ/4 plate; and a light-diffusing layer. The polarizer has a hue a of from −1.2 to 0 and a hue b of from 0 to 3.0.

15 Claims, 4 Drawing Sheets

(56) References Cited

U.S. PATENT DOCUMENTS

| | | |
|---|---|---|
| 9,383,492 B2 | 7/2016 | Hatanaka et al. |
| 9,529,130 B2 | 12/2016 | Hatanaka et al. |
| 9,541,691 B2 | 1/2017 | Hatanaka et al. |
| 9,612,376 B2 | 4/2017 | Nam et al. |
| 9,696,475 B2 | 7/2017 | Hatanaka et al. |
| 10,139,540 B2 | 11/2018 | Hatanaka et al. |
| 10,156,671 B2 | 12/2018 | Kitagawa et al. |
| 10,175,403 B2 | 1/2019 | Nakamura et al. |
| 2004/0223224 A1* | 11/2004 | Murata ............. G02B 5/0278 359/599 |
| 2005/0063062 A1* | 3/2005 | Ito ................. G02B 5/0294 359/599 |
| 2005/0157224 A1 | 7/2005 | Kanbe et al. |
| 2006/0098137 A1* | 5/2006 | Kameyama ......... G02B 5/3033 349/96 |
| 2006/0227423 A1* | 10/2006 | Saiki ................. G02B 5/3033 359/487.02 |
| 2007/0146882 A1* | 6/2007 | Yoshioka ........... G02B 5/3016 359/487.02 |
| 2007/0236632 A1 | 10/2007 | Kanbe et al. |
| 2009/0002608 A1 | 1/2009 | Kameyama et al. |
| 2010/0085641 A1 | 4/2010 | Saiki et al. |
| 2011/0310470 A1* | 12/2011 | Horie ............... G02F 1/133502 359/352 |
| 2012/0249931 A1* | 10/2012 | Tamaki ............. G02F 1/133634 349/96 |
| 2013/0300980 A1* | 11/2013 | Nishimura ........... G02B 5/0242 349/64 |
| 2015/0042941 A1 | 2/2015 | Hatanaka et al. |
| 2015/0042942 A1 | 2/2015 | Hatanaka et al. |
| 2015/0042943 A1 | 2/2015 | Hatanaka et al. |
| 2015/0042944 A1 | 2/2015 | Hatanaka et al. |
| 2015/0043071 A1 | 2/2015 | Hatanaka et al. |
| 2015/0049291 A1 | 2/2015 | Hatanaka et al. |
| 2015/0226999 A1* | 8/2015 | Fuchida ............ G02B 5/0242 349/96 |
| 2015/0234106 A1 | 8/2015 | Nakamura et al. |
| 2015/0277012 A1 | 10/2015 | Nakamura et al. |
| 2015/0301252 A1 | 10/2015 | Nam et al. |
| 2015/0309234 A1 | 10/2015 | Nam et al. |
| 2016/0342003 A1 | 11/2016 | Takeda et al. |
| 2017/0090085 A1* | 3/2017 | Goto ............... G02B 5/3025 |
| 2018/0045872 A1* | 2/2018 | Kitagawa ......... G02B 5/3083 |

FOREIGN PATENT DOCUMENTS

| | | |
|---|---|---|
| CN | 104620142 A | 5/2015 |
| CN | 104981718 A | 10/2015 |
| JP | 2004-333716 A | 11/2004 |
| JP | 2012-208212 A | 10/2012 |
| KR | 10-2005-0065345 A | 6/2005 |
| KR | 10-2005-0070062 A | 7/2005 |
| KR | 10-2012-0070618 A | 6/2012 |
| KR | 10-2014-0063451 A | 5/2014 |
| KR | 10-2015-0018436 A | 2/2015 |
| TW | 200502596 A | 1/2005 |
| TW | 201518791 A | 5/2015 |
| TW | 201543117 A | 11/2015 |
| WO | 2005/062086 A1 | 7/2005 |
| WO | 2010/109723 A1 | 9/2010 |
| WO | 2016/136509 A1 | 9/2016 |

OTHER PUBLICATIONS

Office Action dated Aug. 4, 2020, issued in counterpart CN application No. 201811072506.8, with English translation. (15 pages).

Office Action dated May 23, 2019, issued in counterpart TW Application No. 107129595, with English translation (12 pages).

Office Action dated Jun. 19, 2019, issued in counterpart KR Application No. 10-2018-0109848, with English translation (12 pages).

Office Action dated Oct. 19, 2020, issued in counterpart KR Application No. 10-2018-0109848, with English translation (10 pages).

* cited by examiner

OPTICAL LAMINATE

BACKGROUND OF THE INVENTION

This application claims priority under 35 U.S.C Section 119 to Japanese Patent Application No. 2017-176797 filed on Sep. 14, 2017 which are herein incorporated by reference.

1. Field of the Invention

The present invention relates to an optical laminate.

2. Description of the Related Art

A liquid crystal display apparatus including an optical laminate including a polarizer has been used in various applications. In recent years, the optical laminate has been adopted also in a liquid crystal display apparatus to be mainly used outdoors (e.g., a digital signage) (WO 2010/109723 A1). A reflection-type liquid crystal display apparatus is configured to display an image through the use of ambient light, such as sunlight, as a light source. Accordingly, its power consumption can be significantly suppressed as compared to that of a transmission-type liquid crystal display apparatus requiring a backlight. An attempt has been made to use the reflection-type liquid crystal display apparatus in wider applications because the apparatus has such characteristic. In particular, its application to a large display apparatus whose power consumption is liable to be larger has been desired. However, when the reflection-type liquid crystal display apparatus is increased in size, there occurs a problem in that the appearance of an object varies depending on the angle from which the object is viewed.

SUMMARY OF THE INVENTION

The present invention has been made to solve the conventional problem, and an object of the present invention is to provide an optical laminate that can achieve an excellent reflection hue and an excellent viewing angle characteristic.

An optical laminate of the present invention includes a polarizer; a retardation layer configured to substantially function as a λ/4 plate; and a light-diffusing layer. The polarizer has a hue a of from −1.2 to 0 and a hue b of from 0 to 3.0.

In one embodiment of the present invention, a retardation Re(450) of the retardation layer measured at a wavelength of 450 nm and a retardation Re(550) of the retardation layer measured at a wavelength of 550 nm satisfy a relationship of Re(450)<Re(550).

In one embodiment of the present invention, the light-diffusing layer has a haze value of 80% or more.

In one embodiment of the present invention, the light-diffusing layer contains a pressure-sensitive adhesive and light-diffusing fine particles.

In one embodiment of the present invention, an average particle diameter of the light-diffusing fine particles is from 2 μm to 5 μm.

In one embodiment of the present invention, the light-diffusing fine particles comprise at least one kind selected from the group consisting of a silicone resin, a polystyrene resin, and an acrylic resin.

In one embodiment of the present invention, the pressure-sensitive adhesive comprises an acrylic pressure-sensitive adhesive.

According to another aspect of the present invention, a reflection-type liquid crystal display apparatus is provided. The reflection-type liquid crystal display apparatus includes the above optical laminate.

According to one embodiment of the present invention, the optical laminate that can achieve an excellent reflection hue and an excellent viewing angle characteristic can be provided. More specifically, the optical laminate of the present invention includes, as the polarizer, the polarizer having a hue a of from −1.2 to 0 and a hue b of from 0 to 3.0. Thus, the excellent reflection hue and the excellent viewing angle characteristic can be achieved. Further, the optical laminate of the present invention has the following tendency: unevenness in characteristics on the entirety of the viewer side surface of the optical laminate is smaller than that of a related-art optical laminate. Specifically, depolarization or light leakage in the peripheral edge portion of the optical laminate tends to be small. Accordingly, the optical laminate of the present invention can also be suitably used in a large liquid crystal display apparatus. In addition, the optical laminate of the present invention can also be suitably used in a liquid crystal display apparatus that has a small bezel or is free of any bezel.

DESCRIPTION OF THE EMBODIMENTS

Embodiments of the present invention are described below. However, the present invention is not limited to these embodiments.

(Definitions of Terms and Symbols)

The definitions of terms and symbols used herein are as described below.

(1) Refractive Indices ($n_x$, $n_y$, and $n_z$)

"$n_x$" represents a refractive index in a direction in which an in-plane refractive index is maximum (that is, slow axis direction), "$n_y$" represents a refractive index in a direction perpendicular to the slow axis in the plane (that is, fast axis direction), and "$n_z$" represents a refractive index in a thickness direction.

(2) In-Plane Retardation (Re)

"Re(550)" refers to the in-plane retardation of a film measured at 23° C. with light having a wavelength of 550 nm. The Re(550) is determined from the equation "Re=($n_x$−$n_y$)×d" when the thickness of the film is represented by d (nm). "Re(450)" refers to the in-plane retardation of the film measured at 23° C. with light having a wavelength of 450 nm.

(3) Thickness Direction Retardation (Rth)

"Rth(550)" refers to the thickness direction retardation of a film measured at 23° C. with light having a wavelength of 550 nm. The Rth(550) is determined from the equation "Rth=($n_x$−$n_z$)×d" when the thickness of the film is represented by d (nm). "Rth(450)" refers to the thickness direction retardation of the film measured at 23° C. with light having a wavelength of 450 nm.

(4) Nz Coefficient

An Nz coefficient is determined from the equation "Nz=Rth/Re".

A. Overall Configuration of Optical Laminate

Figure 1:
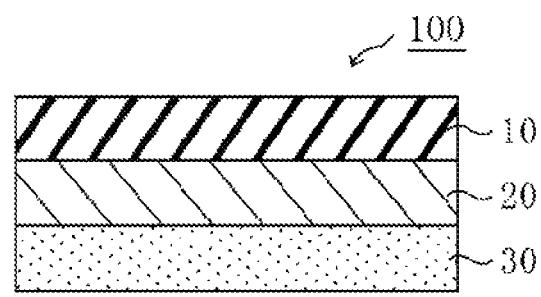
FIG. 1 is a schematic sectional view of an optical laminate according to one embodiment of the present invention.

FIG. 1 is a schematic sectional view of an optical laminate according to one embodiment of the present invention. An optical laminate 100 illustrated in FIG. 1 includes: a polarizer 10; a retardation layer 20 configured to substantially function as a λ/4 plate; and a light-diffusing layer 30. The polarizer 10 has a hue a of from −1.2 to 0 and a hue b of from 0 to 3.0. When the optical laminate includes such polarizer, the optical laminate can achieve an excellent reflection hue and an excellent viewing angle characteristic. The terms "hue a" and "hue b" as used herein refer to single hues defined by the National Bureau of Standards (NBS).

The optical laminate 100, which includes the only one light-diffusing layer 30 in the illustrated example, may include two or more light-diffusing layers. For example, the laminate may further include a light-diffusing layer between the polarizer 10 and the retardation layer 20. In addition, the retardation layer 20 may be a single layer, or may have a laminated structure. The respective layers may be laminated through intermediation of an adhesion layer (an adhesive layer or a pressure-sensitive adhesive layer), though the adhesion layer is not shown. In one embodiment, the light-diffusing layer 30 is a light-diffusing pressure-sensitive adhesive layer. In this embodiment, the light-diffusing layer also functions as an adhesion layer. In addition, the optical laminate 100 may further include any appropriate other layer. Examples of the other layer include a retardation layer except the above-mentioned retardation layer and a surface-treated layer (e.g., an antireflection layer, an antiglare layer, or a hard coat layer).

The optical laminate 100 has a hue change Δab of preferably 3 or less, more preferably 2.5 or less. When the Δab falls within the range, the hues of the optical laminate are further neutralized. The Δab is, for example, 0.1 or more. The hue change Δab may be measured by a method described in Examples to be described later.

The thickness of the optical laminate may be set to any appropriate value. The thickness is typically from about 40 μm to about 300 μm.

B. Polarizer

Any appropriate polarizer may be adopted as the polarizer 10. Specific examples thereof include: a polarizer obtained by subjecting a hydrophilic polymer film, such as a polyvinyl alcohol-based film, a partially formalized polyvinyl alcohol-based film, or an ethylene-vinyl acetate copolymer-based partially saponified film, to dyeing treatment with a dichroic substance, such as iodine or a dichroic dye, and stretching treatment; and a polyene-based alignment film, such as a dehydration-treated product of polyvinyl alcohol or a dehydrochlorination-treated product of polyvinyl chloride. A polarizer obtained by dyeing the polyvinyl alcohol-based film with iodine and uniaxially stretching the resultant is preferably used because the polarizer is excellent in optical characteristics.

The hue a defined by the NBS of the polarizer is from −1.2 to 0, preferably from −1.0 to 0. In addition, the hue b defined by the NBS of the polarizer is from 0 to 3.0, preferably from 0 to 2.5. As the a value and b value of the polarizer are brought closer to 0, a display apparatus in which a display image has a more brilliant color can be obtained. Therefore, ideal values for the a value and the b value are 0.

The polarizer preferably shows absorption dichroism at any wavelength in the wavelength range of from 380 nm to 780 nm. The single layer transmittance of the polarizer is preferably 40.0% or more, more preferably 41.0% or more, still more preferably 42.0% or more.

The thickness of the polarizer is typically from about 0.5 μm to about 80 μm. In one embodiment, the thickness of the polarizer is preferably 70 μm or less, more preferably less than 50 μm, still more preferably 40 μm or less, particularly preferably from 0.5 μm to 40 μm.

The polarization degree of the polarizer is preferably 99.3% or more, more preferably 99.9% or more, still more preferably 99.95% or more.

The polarizer is obtained by, for example, subjecting a resin film to various treatments, such as swelling treatment, stretching treatment, dyeing treatment with a dichroic substance, cross-linking treatment, washing treatment, and drying treatment. In one embodiment, when subjected to the various treatments, the resin film may be a resin layer formed on a substrate. The laminate of the substrate and the resin layer may be obtained by, for example, a method involving applying an application liquid containing a formation material for the resin film to the substrate, or a method involving laminating the resin film on the substrate. Details about such method of producing the polarizer are described in, for example, Japanese Patent Application Laid-open No. 2012-73580. The entire description of the laid-open publication is incorporated herein by reference.

C. Retardation Layer

The retardation layer 20 is a retardation layer configured to substantially function as a λ/4 plate. The incorporation of such retardation layer can improve the viewing angle characteristic of a reflection-type liquid crystal display apparatus adopting the optical laminate of the present invention. The retardation layer 20 only needs to be a layer configured to substantially function as a λ/4 plate. For example, the layer may be a single layer (so-called λ/4 plate), or may be a Layer having a laminated structure, the layer being configured to exhibit an optical compensation function as a λ/4 plate through the combination of a plurality of retardation plates.

The Nz coefficient of the retardation layer is preferably from 1 to 3, more preferably from 1 to 2.5, still more preferably from 1 to 2. When such relationship is satisfied, a more excellent reflection hue can be achieved.

The thickness of the retardation layer may be set so that a desired in-plane retardation may be obtained. The thickness of the retardation layer is preferably from 10 μm to 80 μm, more preferably from 20 μm to 60 μm.

In one embodiment, the retardation layer 20 preferably shows a refractive index characteristic of nx>ny≥nz. The in-plane retardation Re(550) of the retardation layer is preferably from 80 nm to 200 nm, more preferably from 100 nm to 180 nm, still more preferably from 110 nm to 170 nm.

The retardation layer preferably has so-called reverse wavelength dispersion dependency in which its in-plane retardations satisfy a relationship of Re(450)<Re(550). When such relationship is satisfied, an excellent reflection hue can be achieved. A ratio "Re(450)/Re(550)" is preferably 0.8 or more and less than 1, more preferably 0.8 or more and 0.95 or less.

The retardation layer has a slow axis. An angle formed by the slow axis of the retardation layer and the absorption axis of the polarizer is preferably from 38° to 52°, more preferably from 42° to 48°, still more preferably about 45°. With such angle, an extremely excellent antireflection characteristic can be achieved.

The retardation layer is typically a retardation film formed of any appropriate resin. A polycarbonate-based resin is preferably used as the resin forming the retardation film. Details about the polycarbonate-based resin and specific examples thereof are described in, for example, Japanese Patent Application Laid-open No. 2014-026266. The description of the laid-open publication is incorporated herein by reference.

The retardation layer 20 is obtained by, for example, stretching a film formed from the polycarbonate-based resin. Any appropriate forming method may be adopted as a method of forming a film from the polycarbonate-based resin. Specific examples thereof include a compression molding method, a transfer molding method, an injection molding method, an extrusion molding method, a blow molding method, a powder forming method, a FRP molding method, a cast coating method (such as a casting method), a calender molding method, and a hot-press method. Of those, an extrusion molding method or a cast coating method is preferred. This is because the extrusion molding method or the cast coating method can increase the smoothness of the film to be obtained and provide satisfactory optical uniformity. Forming conditions may be appropriately set depending on, for example, the composition and kind of the resin to be used, and the desired characteristics of the retardation layer. For the polycarbonate-based resin, many film products are commercially available, and hence the commercially available films may each be subjected to stretching treatment as it is.

The thickness of the resin film (unstretched film) may be set to any appropriate value depending on, for example, the desired thickness and desired optical characteristics of the retardation layer, and stretching conditions to be described later. The thickness is preferably from 50 μm to 300 μm.

Any appropriate stretching method and stretching conditions (such as a stretching temperature, a stretching ratio, and a stretching direction) may be adopted for the stretching. Specifically, one kind of various stretching methods, such as free-end stretching, fixed-end stretching, free-end shrinkage, and fixed-end shrinkage, may be employed alone, or two or more kinds thereof may be employed simultaneously or sequentially. With regard to the stretching direction, the stretching may be performed in various directions or dimensions, such as a lengthwise direction, a widthwise direction, a thickness direction, and an oblique direction. When the glass transition temperature of the resin film is represented by Tg, the stretching temperature falls within a range of preferably from Tg−30° C. to Tg+60° C., more preferably from Tg−10° C. to Tg+50° C.

A retardation film having the desired optical characteristics (such as a refractive index characteristic, an in-plane retardation, and an Nz coefficient) can be obtained by appropriately selecting the stretching method and stretching conditions.

In one embodiment, the retardation film is produced by subjecting a resin film to uniaxial stretching or fixed-end uniaxial stretching. The fixed-end uniaxial stretching is specifically, for example, a method involving stretching the resin film in its widthwise direction (lateral direction) while running the film in its lengthwise direction. The stretching ratio is preferably from 1.1 times to 3.5 times.

In another embodiment, the retardation film may be produced by continuously subjecting a resin film having an elongate shape to oblique stretching in the direction of a predetermined angle θ with respect to a lengthwise direction. When the oblique stretching is adopted, a stretched film having an elongate shape and having an alignment angle that is the angle θ with respect to the lengthwise direction of the film (having a slow axis in the direction of the angle θ) is obtained, and for example, roll-to-roll process can be performed in its lamination with the polarizer. As a result, the manufacturing process can be simplified. The angle θ may be an angle formed by the absorption axis of the polarizer and the slow axis of the retardation layer.

As a stretching machine to be used for the oblique stretching, for example, there is given a tenter stretching machine capable of applying feeding forces, or tensile forces or take-up forces, having different speeds on left and right sides in a lateral direction and/or a longitudinal direction. Examples of the tenter stretching machine include a lateral uniaxial stretching machine and a simultaneous biaxial stretching machine, and any appropriate stretching machine may be used as long as the resin film having an elongate shape can be continuously subjected to the oblique stretching.

Through appropriate control of each of the speeds on the left and right sides in the stretching machine, a retardation layer (substantially a retardation film having an elongate shape) having the desired in-plane retardation and having a slow axis in the desired direction can be obtained.

The stretching temperature of the film may be changed depending on, for example, the desired in-plane retardation value and thickness of the retardation layer, the kind of the resin to be used, the thickness of the film to be used, and a stretching ratio. Specifically, the stretching temperature is preferably from Tg−30° C. to Tg+30° C., more preferably from Tg−15° C. to Tg+15° C., most preferably from Tg−10° C. to Tg+10° C. When the film is stretched at such temperature, a retardation layer having appropriate characteristics can be obtained. Tg refers to the glass transition temperature of a constituent material for the film.

In another embodiment, the retardation layer shows a flat wavelength dispersion characteristic. In this case, the ratio "Re(450)/Re(550)" of the retardation layer is preferably from 0.99 to 1.03, and the ratio "Re(650)/Re(550)" thereof is preferably from 0.98 to 1.02. In this case, the retardation layer may have a laminated structure. Specifically, a characteristic close to an ideal reverse wavelength dispersion characteristic can be obtained by arranging a retardation film configured to function as a λ/2 plate and a retardation film configured to function as a λ/4 plate at a predetermined axis angle (e.g., from 50° to 70°, preferably about 60°). As a result, an extremely excellent antireflection characteristic can be achieved.

In this embodiment, the angle formed by the slow axis of the retardation layer and the absorption axis of the polarizer may be set to any appropriate angle. For example, the film configured to function as a λ/2 plate and the film configured to function as a λ/4 plate may be arranged so that an angle formed by the slow axis of the film configured to function as a λ/2 plate and the absorption axis of the polarizer may be from 5° to 30°, preferably about 15°, and an angle formed by the slow axis of the film configured to function as a λ/4 plate and the absorption axis of the polarizer may be from 60° to 90°, preferably about 75°. With such angles, an extremely excellent antireflection characteristic can be achieved.

In this embodiment, the retardation layer may include any appropriate resin film that can satisfy the characteristics described above. Typical examples of such resin include a cyclic olefin-based resin, a polycarbonate-based resin, a cellulose-based resin, a polyester-based resin, a polyvinyl alcohol-based resin, a polyamide-based resin, a polyimide-based resin, a polyether-based resin, a polystyrene-based resin, and an acrylic resin. Of those, a cyclic olefin-based resin or a polycarbonate-based resin may be suitably used.

The cyclic olefin-based resin is a generic term for resins each polymerized by using a cyclic olefin as a polymerization unit, and examples thereof include resins described in JP 01-240517 A, JP 03-14882 A, and JP 03-122137 A. Specific examples thereof include: a ring-opened (co)polymer of the cyclic olefin, an addition polymer of the cyclic olefin, a copolymer (typically a random copolymer) of the cyclic olefin and an α-olefin, such as ethylene or propylene, and graft-modified products obtained by modifying the polymers with unsaturated carboxylic acids or derivatives thereof; and hydrogenated produces thereof. Specific examples of the cyclic olefin include norbornene-based monomers.

In the present invention, any other cycloolefin that may be subjected to ring-opening polymerization may be used in combination with the cycloolefin to the extent that the object of the present invention is not impaired. Specific examples of such cycloolefin include compounds each having one reactive double bond, such as cyclopentene, cyclooctene, and 5,6-dihydrodicyclopentadiene.

A commercially available film may be used as a film formed from the cyclic olefin-based resin. Specific examples thereof include: products available under the product names "ZEONEX" and "ZEONOR" from Zeon Corporation; a product available under the product name "Arton" from JSR Corporation; a product available under the product name "TOPAS" from TICONA; and a product available under the product name "APEL" from Mitsui Chemicals, Inc.

D. Light-Diffusing Layer

The light-diffusing layer 30 may include a light-diffusing element, or may include a light-diffusing pressure-sensitive adhesive or a light-diffusing adhesive. The light-diffusing element contains a matrix and light-diffusible fine particles dispersed in the matrix. The light-diffusing element may be a light-diffusing cured layer (e.g., a layer formed by applying a dispersion liquid (application liquid for forming a light-diffusing layer) containing a resin for a matrix and the light-diffusible fine particles, and as required, an additive onto any appropriate substrate, and curing and/or drying the liquid), or may be a light-diffusing film (e.g., a commercial film). The matrix of the light-diffusing pressure-sensitive adhesive includes a pressure-sensitive adhesive, and the matrix of the light-diffusing adhesive includes an adhesive.

The light-diffusing performance of the light-diffusing layer may be represented by, for example, a haze value. The haze value of the light-diffusing layer is preferably 80% or more, more preferably from 80% to 98%, still more preferably from 85% to 98%. When the haze value is set within the range, a liquid crystal display apparatus excellent in viewing angle characteristic can be provided. The haze value of the light-diffusing layer may be controlled by adjusting, for example, a constituent material for the matrix (pressure-sensitive adhesive) of the layer, and a constituent material for, and the volume-average particle diameter and compounding amount, of the light-diffusible fine particles thereof.

The total light transmittance of the light-diffusing layer is preferably 75% or more, more preferably 80% or more, still more preferably 85% or more.

The thickness of the light-diffusing layer may be appropriately adjusted in accordance with, for example, its configuration and desired light-diffusing performance. Specifically, the thickness of the light-diffusing layer is preferably from 5 µm to 100 µm, more preferably from 10 µm to 30 µm.

The light-diffusing layer 30 has the following feature: when a transmitted light intensity in a direction corresponding to a polar angle of 10° and a transmitted light intensity in a direction corresponding to a polar angle of 60° when straight light is caused to enter the light-diffusing layer are defined as I10 and I60, respectively, a value for a ratio "I10/I60" is preferably 30 or more. When the value for the ratio "I10/I60" is 30 or more, the viewing angle characteristic of a reflection-type liquid crystal display apparatus to which the optical laminate has been applied can be improved. The ratio "I10/I60" is more preferably 35 or more, still more preferably 40 or more, still more preferably 50 or more. The ratio "I10/I60" is, for example, 200 or less. The term "polar angle" as used herein refers to an angle when a normal direction is defined as 0°. The transmitted light intensity at each polar angle may be measured by a method described in Examples.

Figure 2:
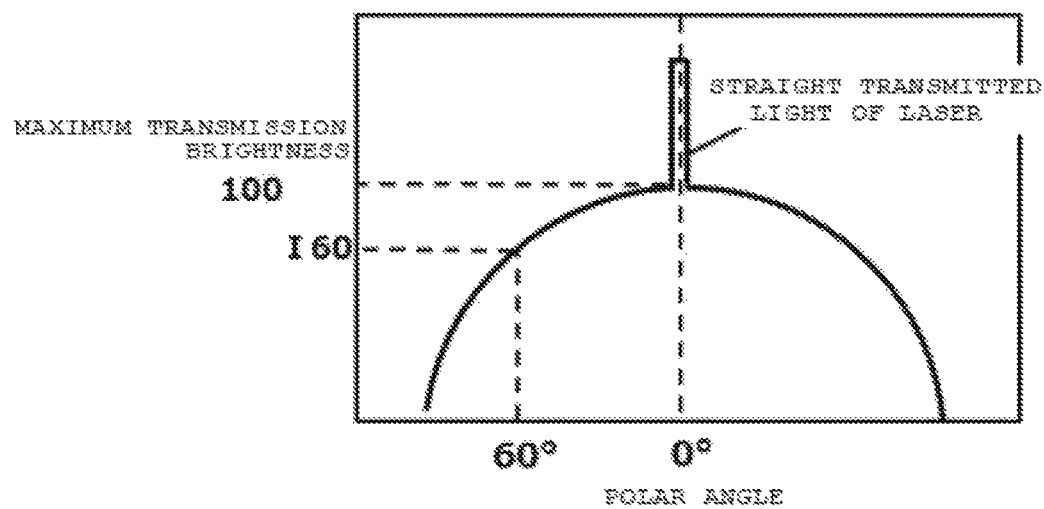
FIG. 2 is a schematic view for illustrating a method of specifying a transmission brightness with laser light.

The normalized brightness of the light-diffusing layer 30 in the direction corresponding to a polar angle of 60° is preferably 1.0 or less, more preferably 0.9 or less, still more preferably 0.8 or less. The normalized brightness in the direction corresponding to a polar angle of 60° is, for example, 0.1 or more. When the normalized brightness in the direction corresponding to a polar angle of 60° falls within the range, a contrast ratio at the time of the application of the optical laminate to a reflection-type liquid crystal display apparatus is improved, and hence its viewing angle characteristic can be improved. In a transmission-type liquid crystal display apparatus, a diffusion profile in a wide-angle region like the direction corresponding to a polar angle of 60° has a small influence on viewability. Meanwhile, in the reflection-type liquid crystal display apparatus in which the optical laminate of the present invention is suitably used, the profile may have a large influence on viewability. The term "normalized brightness" as used herein refers to a brightness at each polar angle when laser light is applied from the front of the light-diffusing layer, the polar angle of diffused light is measured, and the maximum value of a transmission brightness excluding the straight transmitted light of the laser is defined as 100 as illustrated in FIG. 2.

In one embodiment, the light-diffusing layer 30 includes a light-diffusing pressure-sensitive adhesive. The light-diffusing pressure-sensitive adhesive typically contains a pressure-sensitive adhesive serving as a matrix and light-diffusible fine particles dispersed in the pressure-sensitive adhesive. A case in which the light-diffusing layer includes the light-diffusing pressure-sensitive adhesive can contribute to the thinning of a liquid crystal display apparatus because an adhesion layer (a pressure-sensitive adhesive layer or an adhesive layer) at the time of the bonding of any other constituent member, such as the retardation layer, can be omitted.

Any appropriate pressure-sensitive adhesive may be used as the pressure-sensitive adhesive (matrix). Specific examples of the pressure-sensitive adhesive include a rubber-based pressure-sensitive adhesive, an acrylic pressure-sensitive adhesive, a silicone-based pressure-sensitive adhesive, an epoxy-based pressure-sensitive adhesive, and a cellulose-based pressure-sensitive adhesive. Of those, an acrylic pressure-sensitive adhesive is preferred. The use of the acrylic pressure-sensitive adhesive can provide a light-diffusing layer excellent in heat resistance and transparency. The pressure-sensitive adhesives may be used alone or in combination thereof.

Any appropriate acrylic pressure-sensitive adhesive may be used as the acrylic pressure-sensitive adhesive. The glass transition temperature of the acrylic pressure-sensitive adhesive is preferably from −60° C. to −10° C., more preferably from −55° C. to −15° C. The weight-average molecular weight of the acrylic pressure-sensitive adhesive is preferably from 200,000 to 3,000,000, more preferably from 250,000 to 2,800,000. The use of the acrylic pressure-sensitive adhesive having such characteristics can provide an appropriate pressure-sensitive adhesive property.

The refractive index of the acrylic pressure-sensitive adhesive is preferably from 1.40 to 1.65, more preferably from 1.45 to 1.60.

The acrylic pressure-sensitive adhesive is typically obtained by polymerizing a main monomer imparting a pressure-sensitive adhesive property, a comonomer imparting cohesiveness, and a functional group-containing monomer serving as a cross-linking point while imparting a pressure-sensitive adhesive property. The acrylic pressure-sensitive adhesive having the above-mentioned characteristics may be synthesized by any appropriate method, and may be synthesized with reference to, for example, "Chemistry and Application of Adhesion/Pressure-sensitive Adhesion" by Katsuhiko Nakamae published by Dainippon Tosho Publishing Co., Ltd. In addition, a pressure-sensitive adhesive to be applied to a light-diffusing pressure-sensitive adhesive layer, which is disclosed in Japanese Patent Application Laid-open No. 2014-224964, may be used. The description of the literature is incorporated herein by reference.

The content of the pressure-sensitive adhesive in the light-diffusing layer is preferably from 50 wt % to 99.7 wt %, more preferably from 52 wt % to 97 wt %.

Any appropriate fine particles may be used as the light-diffusible fine particles as long as the effects of the present invention are obtained. Specific examples thereof include inorganic fine particles and polymer fine particles. The light-diffusible fine particles are preferably the polymer fine particles. A material for the polymer fine particles is, for example, a silicone resin, a methacrylic resin (e.g., polymethyl methacrylate), a polystyrene resin, a polyurethane resin, or a melamine resin. Those resins can each provide a light-diffusing pressure-sensitive adhesive layer excellent in diffusing performance because the resins each have excellent dispersibility in the pressure-sensitive adhesive and an appropriate refractive index difference from the pressure-sensitive adhesive. The light-diffusing fine particles preferably comprise at least one kind selected from the group consisting of a silicone resin, a polystyrene resin, and an acrylic resin. The shape of each of the light-diffusible fine particles may be, for example, a perfect spherical shape, a flat shape, or an indefinite shape. The light-diffusible fine particles may be used alone or in combination thereof.

In one embodiment, the refractive index of each of the light-diffusible fine particles is lower than the refractive index of the pressure-sensitive adhesive. The refractive index of each of the light-diffusible fine particles is preferably from 1.30 to 1.70, more preferably from 1.40 to 1.65. When the refractive index of each of the light-diffusible fine particles falls within such range, a refractive index difference from the pressure-sensitive adhesive can be set within a desired range. As a result, a light-diffusing layer having a desired haze value can be obtained.

The absolute value of the refractive index difference between each of the light-diffusible fine particles and the pressure-sensitive adhesive is preferably more than 0 and 0.2 or less, more preferably more than 0 and 0.15 or less, still more preferably from 0.01 to 0.13.

The volume-average particle diameter of the light-diffusible fine particles is preferably from 1 µm to 5 µm, more preferably from 2 µm to 5 µm, still more preferably from 3 µm to 5 µm. When the volume-average particle diameter of the light-diffusible fine particles falls within such range, a light-diffusing pressure-sensitive adhesive layer having a desired haze value and having a neutral hue can be obtained. The volume-average particle diameter may be measured with, for example, an ultracentrifugal automatic particle size distribution-measuring apparatus.

The content of the light-diffusible fine particles in the light-diffusing pressure-sensitive adhesive is preferably from 0.3 wt % to 50 wt %, more preferably from 3 wt % to 48 wt %. When the content of the light-diffusible fine particles is set within the range, a light-diffusing pressure-sensitive adhesive layer having excellent light-diffusing performance can be obtained.

The light-diffusing layer may contain any appropriate additive. Examples of the additive include an antistatic agent and an antioxidant.

In another embodiment, the light-diffusing layer includes a light-diffusing element. In this case, the light-diffusing layer typically contains a matrix and light-diffusible fine particles dispersed in the matrix. The matrix includes, for example, a resin curable with ionizing radiation. Examples of the ionizing radiation include UV light, visible light, an infrared ray, and an electron beam. Of those, UV light is preferred. Therefore, the matrix preferably includes a UV-curable resin. Examples of the UV-curable resin include an acrylic resin, an aliphatic (e.g., polyolefin) resin, and a urethane-based resin. With regard to the light-diffusible fine particles, the same fine particles as the light-diffusible fine particles that may be used in the light-diffusing pressure-sensitive adhesive may be used.

The light-diffusing layer may be formed by, for example, applying a dispersion liquid (application liquid for forming a light-diffusing layer) containing a pressure-sensitive adhesive (or an adhesive or a resin for a matrix) and the light-diffusible fine particles, and as required, an additive onto any appropriate substrate, and curing and/or drying the liquid. The substrate may be, for example, a separator, or may be the polarizer or the retardation film. As described above, the light-diffusing layer may be formed by application. Accordingly, when a retardation film having an elongate shape and a polarizer having an elongate shape are used, an optical laminate can be produced by a roll-to-roll process, and as a result, the production efficiency of a liquid crystal display apparatus can be improved.

E. Reflection-Type Liquid Crystal Display Apparatus

A reflection-type liquid crystal display apparatus of the present invention includes the optical laminate. The inclusion of the optical laminate can improve the reflection hue and viewing angle characteristic of the liquid crystal display apparatus. In one embodiment, the reflection-type liquid crystal display apparatus of the present invention can be suitably used as a liquid crystal display apparatus to be used outdoors because the apparatus can efficiently utilize ambient light. In addition, as described above, the liquid crystal display apparatus of the present invention is excellent in reflection hue and viewing angle characteristic. Accordingly, even when the apparatus is used as a large liquid crystal display apparatus, satisfactory viewability can be secured. When the apparatus is used as a large liquid crystal display apparatus, the apparatus may be used as one large display apparatus, or the plurality of liquid crystal display apparatus may be arranged (e.g., 3 apparatus in a longitudinal direction by 4 apparatus in a lateral direction) to provide a large liquid crystal display apparatus. As described above, depolarization or light leakage in the peripheral edge portion of the optical laminate to be used in the reflection-type liquid crystal display apparatus of the present invention tends to be small. Accordingly, the optical laminate can also be suitably used in a large liquid crystal display apparatus. Further, the optical laminate can also be suitably used in a liquid crystal display apparatus that has a small bezel or is free of any bezel.

As described above, the liquid crystal display apparatus of the present invention is used as a large liquid crystal display apparatus. When the apparatus is used as one large liquid crystal display apparatus, the apparatus can be used as, for example, a liquid crystal display apparatus whose display screen has a size of 20 inches or more.

EXAMPLES

The present invention is specifically described below by way of Examples. However, the present invention is not limited by these Examples. Methods of measuring respective characteristics are as described below. The terms "part(s)" and "%" in Examples and Comparative Examples are on a weight basis unless otherwise specified.

(1) Thickness

Measurement was performed with a dial gauge (manufactured by PEACOCK, product name: "DG-205 type pds-2").

(2) Retardation

Measurement was performed with AxoScan manufactured by Axometrics, Inc. Measurement wavelengths were 450 nm and 550 nm, and a measurement temperature was 23° C. A film piece measuring 50 mm by 50 mm was cut out of a retardation film and used as a measurement sample.

(3) Refractive Index of Pressure-Sensitive Adhesive

The refractive index of a pressure-sensitive adhesive applied onto a transparent substrate, the pressure-sensitive adhesive being free of light-diffusible fine particles, was measured with an Abbe refractometer (DR-M2, manufactured by Atago Co., Ltd.).

(4) Haze Value

The haze values of light-diffusing layers formed in Examples and Comparative Examples were measured by a method specified in JIS K7136 with a haze meter (manufactured by Murakami Color Research Laboratory Co., Ltd., product name: "HN-150").

(5) Transmittance

The transmittances of polarizers obtained in Reference Examples 1 and 2 were measured with a spectrophotometer (manufactured by JASCO Corporation, product name: "V-7100"). The transmittances are each a Y value subjected to visibility correction with the two-degree field of view (C light source) of JIS Z 8701-1982.

(6) Hue a and Hue b

The hues a and b of each of the polarizers obtained in Reference Example 1 and Reference Example 2 were measured. The measurement was performed with a spectrophotometer (manufactured by JASCO Corporation, product name: "V-7100").

(7) Hue Change

The hue change $\Delta ab$ of each of optical laminates obtained in Examples and Comparative Example was measured. A brightness meter (manufactured by Topcon Corporation, product name: "SR-UL1") was used in the measurement. The measurement was performed while each of the optical laminates was placed on a reflective plate (manufactured by Toray Advanced Film Co., Ltd., product name: "CERAPEEL DMS-X42"). A fluorescent lamp (200 1x: a value measured with an illuminometer IM-5) was arranged so that its output light entered at an angle of 30° relative to the vertical direction of the optical laminate, followed by the irradiation of the optical laminate with the light. The $\Delta ab$ was calculated from the following equation by using values for: hues ($a_0$, $b_0$) measured for NBS (a, b) under such a condition that only the reflective plate was irradiated with the light from the fluorescent lamp; and hues ($a_x$, $b_x$) measured therefor under a state in which the optical laminate was placed on the reflective plate.

$$\Delta ab = \sqrt{(a_0-a_x)^2+(b_0-b_x)^2}$$

(8) Transmitted Light Intensity

Laser light was applied from the front of a light-diffusing layer. A transmitted light intensity with respect to the polar angle of diffused light was measured with a goniophotometer (manufactured by Hamamatsu Photonics K.K., product name: "S2592-03") every 1°. A transmitted light intensity in a direction corresponding to a polar angle of 10° and a transmitted light intensity in a direction corresponding to a polar angle of 60° when the maximum value of a transmitted light intensity excluding the straight transmitted light of the laser was defined as 100 as illustrated in FIG. 2 were defined as I10 and I60, respectively, and the intensities were calculated.

(9) Contrast

Figure 3A:
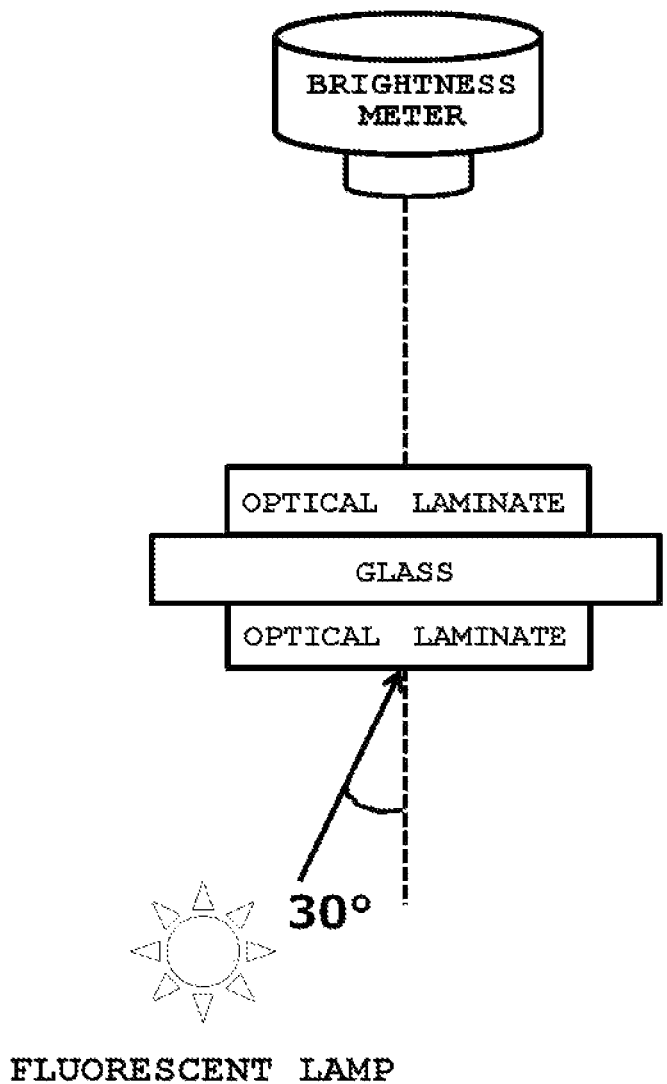
FIG. 3A is a schematic view for illustrating a method of measuring a front white brightness and FIG. 3B is a schematic view for illustrating a method of measuring a front black brightness.

A brightness meter, optical laminates, glass, and a fluorescent lamp were arranged as illustrated in FIG. 3A to measure a front white brightness. More specifically, the optical laminates identical to each other were placed on both surfaces of the glass (thickness: 1.3 μm), and the fluorescent lamp (200 1x: a value measured with an illuminometer IM-5) was arranged so that its light entered at an angle of 30° relative to the vertical direction of one of the optical laminates, followed by the irradiation of the optical laminate with the light. The brightness of light output in the vertical direction of the optical laminate on the side on which the fluorescent lamp was not arranged was measured with the brightness meter (manufactured by Topcon Corporation, product name: "SR-UL1", measurement distance: 500 mm, measurement angle: 2°), and the resultant value was defined as the front white brightness.

Figure 3B:
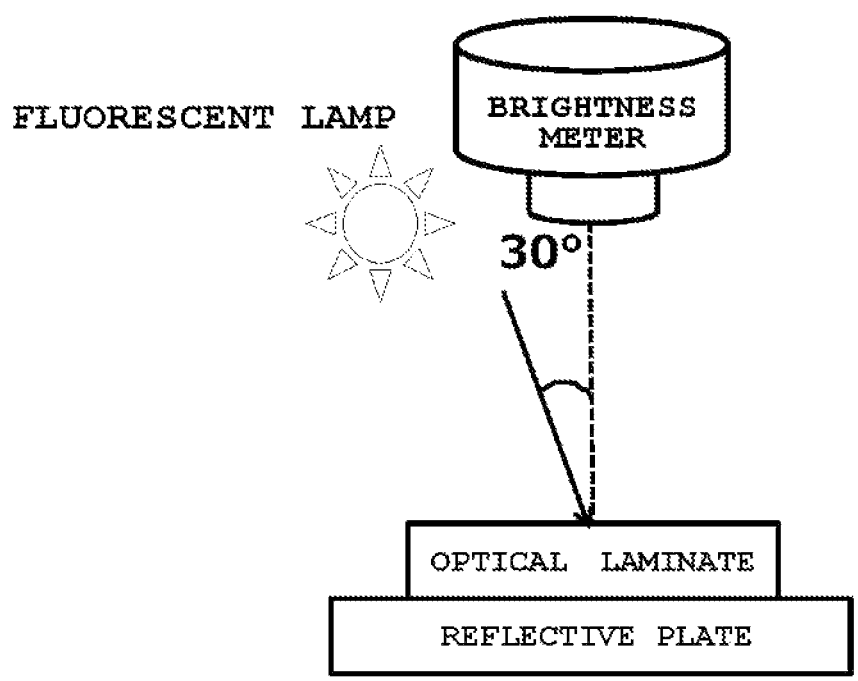

In addition, a brightness meter, an optical laminate, a reflective plate, and a fluorescent lamp were arranged as illustrated in FIG. 3B to measure a black brightness. More specifically, the optical laminate was placed on the reflective plate (manufactured by Toray Advanced Film Co., Ltd., product name: "Cerapeel DMS-X42"), and the above-mentioned fluorescent lamp was arranged so that its light entered at an angle of 30° relative to the vertical direction of the optical laminate, followed by the irradiation of the optical laminate with the light. The brightness of reflected light in the vertical direction was measured with the brightness meter, and the resultant value was defined as a front black brightness.

A contrast ratio was calculated by dividing the measured front white brightness by the front black brightness.

Reference Example 1

Production of Polarizer 1

An amorphous isophthalic acid-copolymerized polyethylene terephthalate (IPA-copolymerized PET) film (thickness: 100 μm) having an elongate shape, a water absorption ratio of 0.75%, and a Tg of 75° C. was used as a substrate. One surface of the substrate was subjected to corona treatment, and an aqueous solution containing polyvinyl alcohol (polymerization degree: 4,200, saponification degree: 99.2 mol %) and acetoacetyl-modified PVA (polymerization degree: 1,200, acetoacetyl modification degree: 4.6%, saponification degree: 99.0 mol % or more, manufactured by the Nippon Synthetic Chemical Industry Co., Ltd., product name: "GOHSEFIMER Z-200") at a ratio of 9:1 was applied to the corona-treated surface and dried at 25° C. to form a PVA-based resin layer having a thickness of 11 μm. Thus, a laminate was produced.

The resultant laminate was subjected to free-end uniaxial stretching in an oven at 120° C. between rolls having different peripheral speeds in its longitudinal direction (lengthwise direction) at 2.0 times (in-air auxiliary stretching).

Next, the laminate was immersed in an insolubilizing bath having a liquid temperature of 30° C. (an aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. while the iodine concentration of the bath and an immersion time were adjusted so that a polarizing plate to be obtained had a predetermined transmittance. In this example, the laminate was immersed in an aqueous solution of iodine, which had been obtained by compounding 100 parts by weight of water with 0.2 part by weight of iodine and 1.5 parts by weight of potassium iodide, for 60 seconds (dyeing treatment).

Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 30 seconds (cross-linking treatment).

After that, while the laminate was immersed in an aqueous solution of boric acid having a liquid temperature of 70° C. (an aqueous solution obtained by compounding 100 parts by weight of water with 4 parts by weight of boric acid and 5 parts by weight of potassium iodide), the laminate was subjected to uniaxial stretching between rolls having different peripheral speeds in the longitudinal direction (lengthwise direction) so that the total stretching ratio became 5.5 times (underwater stretching).

After that, the laminate was immersed in a washing bath having a liquid temperature of 30° C. (an aqueous solution obtained by compounding 100 parts by weight of water with 4 parts by weight of potassium iodide) (washing treatment).

Subsequently, an aqueous solution of a PVA-based resin (manufactured by the Nippon Synthetic Chemical Industry Co., Ltd., product name: "GOHSEFIMER (trademark) Z-200," resin concentration: 3 wt %) was applied to the PVA-based resin layer surface of the laminate, and a protective film (thickness: 25 μm) was bonded thereto. The resultant was heated in an oven maintained at 60° C. for 5 minutes. After that, the substrate was peeled from the PVA-based resin layer. Thus, a polarizing plate (polarizer (transmittance: 42.3%, thickness: 5 μm)/protective film) was obtained. The resultant polarizer had a hue a of −0.8 and a hue b of 2.3.

Reference Example 2

Production of Polarizer 2

While a polyvinyl alcohol-based film (PVA film) having a thickness of 75 μm (manufactured by Kuraray Co., Ltd., product name: "VF-PS-N#7500") was immersed in hot water having a liquid temperature of 25° C. (swelling bath) to be swollen, the film was stretched in a flow direction so that a stretching ratio became 2.4 times with respect to its original length.

Next, while the film was immersed in a dyeing bath having a liquid temperature of 30° C. (an aqueous solution of iodine obtained by compounding 100 parts by weight of water with 0.04 part by weight of iodine and 0.4 part by weight of potassium iodide) for 60 seconds to be dyed, the film was stretched in the flow direction so that a stretching ratio became 3.3 times with respect to the original length.

Next, the film was immersed in an aqueous solution having a liquid temperature of 30° C. (an aqueous solution obtained by compounding 100 parts by weight of water with 4 parts by weight of boric acid and 3 parts by weight of potassium iodide) for 30 seconds.

Next, while the film was immersed in a stretching bath having a liquid temperature of 60° C. (an aqueous solution obtained by compounding 100 parts by weight of water with 4 parts by weight of boric acid and 5 parts by weight of potassium iodide) for 40 seconds, the film was stretched in the flow direction so that a stretching ratio became 6 times with respect to the original length.

Next, the film was immersed in a washing bath having a liquid temperature of 30° C. (an aqueous solution obtained by compounding 100 parts by weight of water with 3 parts by weight of potassium iodide) for 10 seconds to be washed. Further, the film was dried at 50° C. for 4 minutes to provide a polarizer.

Subsequently, an aqueous solution of a PVA-based resin (manufactured by the Nippon Synthetic Chemical Industry Co., Ltd., product name: "GOHSEFIMER (trademark) Z-200", resin concentration: 3 wt %) was applied to the surface of the resultant polarizer, and a protective film (thickness: 25 μm) was bonded thereto. The resultant was heated in an oven maintained at 60° C. for 5 minutes to provide a polarizing plate (polarizer (transmittance: 42.3%, thickness: 28 μm)/protective film). The resultant polarizer had a hue a of −1.4 and a hue b of 3.5.

Reference Example 3

Production of Light-Diffusing Pressure-Sensitive Adhesive

An application liquid of a light-diffusing pressure-sensitive adhesive (solid content: 13.2%) was prepared by compounding 100 parts of the solid content of an acrylic polymer solution with 0.6 part of an isocyanate cross-linking agent (manufactured by Nippon Polyurethane Industry Co., Ltd., product name: "CORONATE L") and 29 parts of silicone resin fine particles (manufactured by Momentive Performance Materials Inc., product name: "TOSPEARL 145", volume-average particle diameter: 4 μm) serving as light-diffusible fine particles.

Reference Example 4

Production of Retardation Film 1

Polymerization was performed with a batch polymerization apparatus formed of two vertical reactors each including a stirring blade and a reflux condenser controlled to 100° C. 9,9-Bis[4-(2-hydroxyethoxy) phenyl] fluorene (BHEPF), isosorbide (ISB), diethylene glycol (DEG), diphenyl carbonate (DPC), and magnesium acetate tetrahydrate were loaded into the apparatus so that a molar ratio "BHEPF/ISB/DEG/DPC/magnesium acetate" became $0.348/0.490/0.162/1.005/1.00 \times 10^{-5}$. After each of the reactors had been sufficiently purged with nitrogen (oxygen concentration: from 0.0005 vol % to 0.001 vol %), the warming of reactors was performed with a heating medium, and at the time point when a temperature in each of the reactors (internal temperature) became 100° C., the stirring of the mixture was initiated. 40 Minutes after the initiation of the temperature increase, the internal temperature was caused to reach 220° C., and such control that the temperature was held was performed. At the same time, a pressure reduction was initiated to set a pressure in each of the reactors to 13.3 kPa 90 minutes after the temperature had reached 220° C. Phenol vapor produced as a by-product in association with the polymerization reaction was introduced into the reflux condenser at 100° C. A monomer component present in a slight amount in the phenol vapor was returned to the reactors, and phenol vapor that was not condensed was introduced into a condenser at 45° C. and recovered.

Nitrogen was introduced into the first reactor to return the pressure therein to an atmospheric pressure once. After that, an oligomerized reaction liquid in the first reactor was transferred to the second reactor. Next, an increase in temperature in the second reactor and a reduction in pressure therein were initiated to set the internal temperature and the pressure to 240° C. and 0.2 kPa, respectively in 50 minutes. After that, the polymerization was advanced until predetermined stirring power was obtained. At the time point when the predetermined power was achieved, nitrogen was introduced into the second reactor to return the pressure to the atmospheric pressure, and the reaction liquid was extracted in the form of a strand and pelletized with a rotary cutter to provide a polycarbonate resin A having the following copolymer composition: BHEPF/ISB/DEG=34.8/49.0/16.2 [mol %]. The polycarbonate resin had a reduced viscosity of 0.430 dL/g and a glass transition temperature of 128° C.

The resultant polycarbonate resin was vacuum-dried at 80° C. for 5 hours. After that, a polycarbonate resin film having a thickness of 130 μm was produced from the vacuum-dried product with a film-producing apparatus including a uniaxial extruder (manufactured by Isuzu Kakoki, screw diameter: 25 mm, cylinder preset temperature: 220° C.), a T-die (width: 900 mm, preset temperature: 220° C.), a chill roll (preset temperature: 125° C.), and a winding machine.

(Oblique Stretching)

The polycarbonate resin film obtained as described above was subjected to oblique stretching by a method in conformity with Example 1 of Japanese Patent Application Laid-open No. 2014-194483 to provide a retardation film. With regard to the detailed configuration of a stretching apparatus, the description of Japanese Patent Application Laid-open No. 2014-194483 is incorporated herein by reference. A specific production procedure for the retardation film is as described below. The polycarbonate resin film (thickness: 130 μm, width: 765 mm) was preheated to 142° C. in the preheating zone of the stretching apparatus. In the preheating zone, the clip pitches of left and right clips were 125 mm. Next, simultaneously with the entry of the film into a first oblique stretching zone C1, an increase in clip pitch of the right clips was initiated, and the clip pitch was increased from 125 mm to 177.5 mm in the first oblique stretching zone C1. A clip pitch change ratio was 1.42. In the first oblique stretching zone C1, a reduction in clip pitch of the left clips was initiated, and the clip pitch was reduced from 125 mm to 90 mm in the first oblique stretching zone C1. A clip pitch change ratio was 0.72. Further, simultaneously with the entry of the film into a second oblique stretching zone C2, an increase in clip pitch of the left clips was initiated, and the clip pitch was increased from 90 mm to 177.5 mm in the second oblique stretching zone C2. Meanwhile, the clip pitch of the right clips was maintained at 177.5 mm in the second oblique stretching zone C2. In addition, simultaneously with the oblique stretching, the film was also stretched in its widthwise direction at 1.9 times. The oblique stretching was performed at 135° C.

(MD Shrinkage Treatment)

Next, a MD shrinkage treatment was performed in a shrinkage zone. Specifically, both the clip pitches of the left clips and the right clips were reduced from 177.5 mm to 165 mm. A shrinkage ratio in the MD shrinkage treatment was 7.0%.

Thus, a retardation film 1 (thickness: 50 μm) was obtained. The resultant retardation film had an Re(550) of 141 nm and showed a reverse dispersion characteristic.

Reference Example 5

Production of Retardation Film 2

A cycloolefin-based retardation film A (manufactured by Kaneka Corporation, product name: "KUZ-FILM #270," thickness: 33 μm. Re(550)=270 nm, Re(450)/Re(550)=1.00, Nz coefficient=1.00) and a cycloolefin-based retardation film B (manufactured by Kaneka Corporation, product name: "KUZ-FILM #140," thickness: 28 μm, Re(550)=140 nm, Re(450)/Re(550)=1.00, Nz coefficient=1.00) were bonded to each other through intermediation of a light-diffusing pressure-sensitive adhesive layer having a thickness of 23 μm (light-diffusing pressure-sensitive adhesive composition obtained in Reference Example 3) so that an angle formed by their respective slow axes became 60°. Thus, a retardation film 2 was produced.

Example 1

Production of Optical Laminate 1

The light-diffusing pressure-sensitive adhesive composition obtained in Reference Example 3 was applied to the polarizer side of the polarizing plate obtained in Reference Example 1 so that its thickness after drying became 23 μm. Thus, a light-diffusing pressure-sensitive adhesive layer was formed. The retardation film obtained in Reference Example 4 was arranged and bonded to the polarizer of the polarizing plate so that an angle formed by the slow axis of the retardation film and the absorption axis of the polarizer became 45°. Next, the light-diffusing pressure-sensitive adhesive composition was applied to the surface of the retardation film to which the polarizer was not bonded so that its thickness after drying became 23 μm. Thus, another light-diffusing pressure-sensitive adhesive layer was formed. After that, the layers were dried and cured. Thus, an optical laminate 1 was obtained.

The resultant optical laminate had a Δab of 2.3 and a contrast ratio of 269. The light-diffusing layers (light-diffusing pressure-sensitive adhesive layers) had an I10 of 64 and an I60 of 0.67, and hence had a ratio "I10/I60" of 96. In addition, light-diffusing layers (light-diffusing pressure-sensitive adhesive layers) each had a haze of 95.1%.

Example 2

Production of Optical Laminate 2

The light-diffusing pressure-sensitive adhesive composition obtained in Reference Example 3 was applied to the polarizer side of the polarizing plate obtained in Reference Example 1 so that its thickness after drying became 23 μm. Thus, a light-diffusing pressure-sensitive adhesive layer was formed. The retardation film obtained in Reference Example 5 was bonded thereto. Thus, an optical laminate 2 was obtained.

The resultant optical laminate had a Δab of 2.9 and a contrast ratio of 237. The light-diffusing pressure-sensitive adhesive layers had an I10 of 64 and an I60 of 0.67, and hence had a ratio "I10/I60" of 96. In addition, the light-diffusing pressure-sensitive adhesive layers each had a haze of 95.1%.

Comparative Example 1

Production of Optical Laminate C1

An optical laminate C1 was obtained in the same manner as in Example 1 except that the polarizer 2 obtained in Reference Example 2 was used as a polarizer.

The resultant optical laminate had a Δab of 4.8 and a contrast ratio of 266. The light-diffusing pressure-sensitive adhesive layers had an I10 of 64 and an I60 of 0.67, and hence had a ratio "I10/I60" of 96. In addition, the light-diffusing pressure-sensitive adhesive layers each had a haze of 95.1%.

[Evaluation]

The hue change Δab of each of the optical laminates obtained in Examples 1 and 2 was suppressed to 3 or less, and hence their reflection hues were neutralized. Those optical laminates had high contrast ratios, and hence had excellent reflection hues and excellent viewing angle characteristics. Further, in the optical laminate of Example 1 including the retardation layer having a reverse dispersion characteristic, a reflection hue-neutralizing effect was further exhibited.

The reflection-type liquid crystal display apparatus of the present invention is suitably used as an image display apparatus to be used outdoors.

What is claimed is:

1. An optical laminate, comprising:
   a polarizer;
   a retardation layer configured to substantially function as a λ/4 plate; and
   a light-diffusing layer,
   wherein the polarizer has a hue a of from −1.2 to 0 and a hue b of from 0 to 3.0,
   the optical laminate has a hue change Δab of 3 or less, and
   a value for a ratio, I10/I60, of a transmitted light intensity in a direction corresponding to a polar angle of 10°, I10, and a transmitted light intensity in a direction corresponding to a polar angle of 60°, I60, when straight light is caused to enter the light-diffusing layer, is 30 or more, and
   wherein the polarizer is obtained by dyeing a polyvinyl alcohol-based film with iodine and then uniaxially stretching the dyed polyvinyl alcohol-based film.

2. The optical laminate according to claim 1, wherein a retardation Re(450) of the retardation layer measured at a wavelength of 450 nm and a retardation Re(550) of the retardation layer measured at a wavelength of 550 nm satisfy a relationship of Re(450)<Re(550).

3. The optical laminate according to claim 1, wherein the light-diffusing layer has a haze value of 80% or more.

4. The optical laminate according to claim 1, wherein the light-diffusing layer contains a pressure-sensitive adhesive and light-diffusing fine particles.

5. The optical laminate according to claim 4, wherein an average particle diameter of the light-diffusing fine particles is from 2 μm to 5 μm.

6. The optical laminate according to claim 4, wherein the light-diffusing fine particles comprise at least one kind selected from the group consisting of a silicone resin, a polystyrene resin, and an acrylic resin.

7. The optical laminate according to claim 4, wherein the pressure-sensitive adhesive comprises an acrylic pressure-sensitive adhesive.

8. A reflection-type liquid crystal display apparatus, comprising the optical laminate of claim 1.

9. A reflection-type liquid crystal display apparatus, comprising the optical laminate of claim 2.

10. A reflection-type liquid crystal display apparatus, comprising the optical laminate of claim 3.

11. A reflection-type liquid crystal display apparatus, comprising the optical laminate of claim 4.

12. A reflection-type liquid crystal display apparatus, comprising the optical laminate of claim 5.

13. A reflection-type liquid crystal display apparatus, comprising the optical laminate of claim 6.

14. A reflection-type liquid crystal display apparatus, comprising the optical laminate of claim 7.

15. An optical laminate, comprising:
   a polarizer;
   a retardation layer configured to substantially function as a λ/4 plate; and
   a light-diffusing layer, and
   wherein the polarizer has a hue a of from −1.2 to 0 and a hue b of from 0 to 3.0,
   a value for a ratio, I10/I60, of a transmitted light intensity in a direction corresponding to a polar angle of 10°, I10, and a transmitted light intensity in a direction corresponding to a polar angle of 60°, I60, when straight light is caused to enter the light-diffusing layer is 30 or more,
   wherein the polarizer is obtained by dyeing a polyvinyl alcohol-based film with iodine and then uniaxially stretching the dyed polyvinyl alcohol-based film,
   the retardation layer is obtained by stretching a film formed from resin, and
   the light-diffusing layer contains a pressure-sensitive adhesive and light-diffusing fine particles.

* * * * *